United States Patent
Nevison

(10) Patent No.: US 11,812,878 B1
(45) Date of Patent: Nov. 14, 2023

(54) PACKAGE RECEIVING SYSTEM AND METHOD OF USE

(71) Applicant: Martin Andrew Nevison, Fort Worth, TX (US)

(72) Inventor: Martin Andrew Nevison, Fort Worth, TX (US)

( * ) Notice: Subject to any disclaimer, the term of this patent is extended or adjusted under 35 U.S.C. 154(b) by 0 days.

(21) Appl. No.: 17/208,927

(22) Filed: Mar. 22, 2021

Related U.S. Application Data

(63) Continuation-in-part of application No. 16/271,864, filed on Feb. 10, 2019, now Pat. No. 10,954,068.

(60) Provisional application No. 62/628,989, filed on Feb. 10, 2018.

(51) Int. Cl.
  *A47G 29/14* (2006.01)
  *H04L 9/06* (2006.01)
  *H04L 9/00* (2022.01)

(52) U.S. Cl.
  CPC .......... *A47G 29/141* (2013.01); *H04L 9/0643* (2013.01); *A47G 2029/143* (2013.01); *A47G 2029/145* (2013.01); *A47G 2029/149* (2013.01); *H04L 9/50* (2022.05)

(58) Field of Classification Search
  CPC .................. A47G 29/141; A47G 29/30; A47G 2029/143; A47G 2029/144; A47G 2029/145; A47G 2029/149; A47G 29/1251; H04L 9/0643; H04L 9/50
  USPC ............................ 232/19, 45, 34–36, 1 E, 51
  See application file for complete search history.

(56) References Cited

U.S. PATENT DOCUMENTS

| | | | |
|---|---|---|---|
| 386,757 A * | 7/1888 | Regester ................ | A47G 29/16 43/67 |
| 2,428,509 A | 10/1947 | Baker | |
| 3,204,740 A | 9/1965 | Legault | |
| 3,279,685 A | 10/1966 | Price | |
| 3,615,050 A | 10/1971 | Leipelt et al. | |
| 3,880,344 A * | 4/1975 | Earle ................... | A47G 29/1251 D99/32 |
| 5,772,112 A | 6/1998 | Bulcroft | |
| 5,774,053 A | 6/1998 | Porter | |
| 5,979,750 A * | 11/1999 | Kindell ................ | A47G 29/141 232/1 R |
| 6,415,552 B1 | 7/2002 | Khosropour | |
| 6,484,531 B1 | 11/2002 | Hambleton | |
| 6,719,195 B2 * | 4/2004 | Farentinos ............ | A47G 29/22 232/47 |
| 6,920,835 B1 | 7/2005 | Johnson | |
| 6,967,575 B1 * | 11/2005 | Dohrmann ........... | G06Q 20/367 340/5.31 |
| 7,175,070 B1 | 2/2007 | Brisport | |
| 7,256,691 B2 * | 8/2007 | Awobue ............. | A47G 29/1214 340/569 |
| 7,815,112 B2 * | 10/2010 | Volpe ...................... | G07F 17/13 340/568.1 |
| 7,913,898 B2 * | 3/2011 | Frankenberg .......... | A47G 29/22 312/297 |

(Continued)

*Primary Examiner* — William L Miller
(74) *Attorney, Agent, or Firm* — Avek IP, LLC

(57) ABSTRACT

A package receiving system includes a cabinet anchored on an exterior of a building; an opening providing access to an interior of the cabinet; and a control system incorporated into the cabinet, the control system having a scanner to read a code associated with a package; the opening allows for the package to be received into the cabinet; and the control system is to capture data associated with the package entering the cabinet.

10 Claims, 9 Drawing Sheets

(56) References Cited

U.S. PATENT DOCUMENTS

| | | |
|---|---|---|
| 8,523,050 B1 | 9/2013 | Andreozzi |
| 9,211,025 B1 * | 12/2015 | Elhawwashy .......... A47G 29/20 |
| 10,314,424 B2 * | 6/2019 | Geng ..................... A47G 29/20 |
| 10,588,440 B1 | 3/2020 | Kajgana |
| 2002/0035857 A1 | 3/2002 | Stein |
| 2002/0087375 A1 | 7/2002 | Griffin |
| 2003/0006275 A1 | 1/2003 | Gray |
| 2004/0080414 A1 | 4/2004 | Darty |
| 2004/0133304 A1 | 7/2004 | Fobbe |
| 2005/0104730 A1 * | 5/2005 | Yang .................... A47G 29/141 |
| | | 340/569 |
| 2006/0179724 A1 | 8/2006 | Lee |
| 2009/0166403 A1 | 7/2009 | Volpe |
| 2017/0124510 A1 | 5/2017 | Caterino |
| 2017/0147975 A1 * | 5/2017 | Natarajan .......... G07C 9/00182 |
| 2017/0286905 A1 * | 10/2017 | Richardson ........ G06Q 10/0832 |
| 2018/0070753 A1 * | 3/2018 | Eveloff ................ H04W 4/025 |
| 2018/0225628 A1 * | 8/2018 | Roy .................... A47G 29/141 |
| 2019/0000255 A1 | 1/2019 | Dehner |
| 2019/0167025 A1 * | 6/2019 | Cherry .................. A47G 29/16 |
| 2019/0231106 A1 | 8/2019 | Kaiserman |
| 2019/0300202 A1 | 10/2019 | High |

* cited by examiner

PACKAGE RECEIVING SYSTEM AND METHOD OF USE

BACKGROUND

1. Field of the Invention

The present invention relates generally to package and mail delivery systems, and more specifically, to a package receiving system for package protection and theft prevention.

2. Description of Related Art

Package and mail receiving systems are well known in the art and are effective means to receive deliveries. For example, FIG. 1 depicts a conventional system 101 having a mailbox 103 for receiving mail 105 therein. During use, mail is commonly left for long periods of time within the mailbox until retrieved by the resident. Further, it is conventional for larger packages to be left on porches or next to doors.

One of the problems commonly associated with system 101 and other conventional package receiving methods is security. For example, packages can be exposed to the elements, such as rain if left on the porch. Further, mail and packages are vulnerable to being stolen.

Accordingly, although great strides have been made in the area of package receiving systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
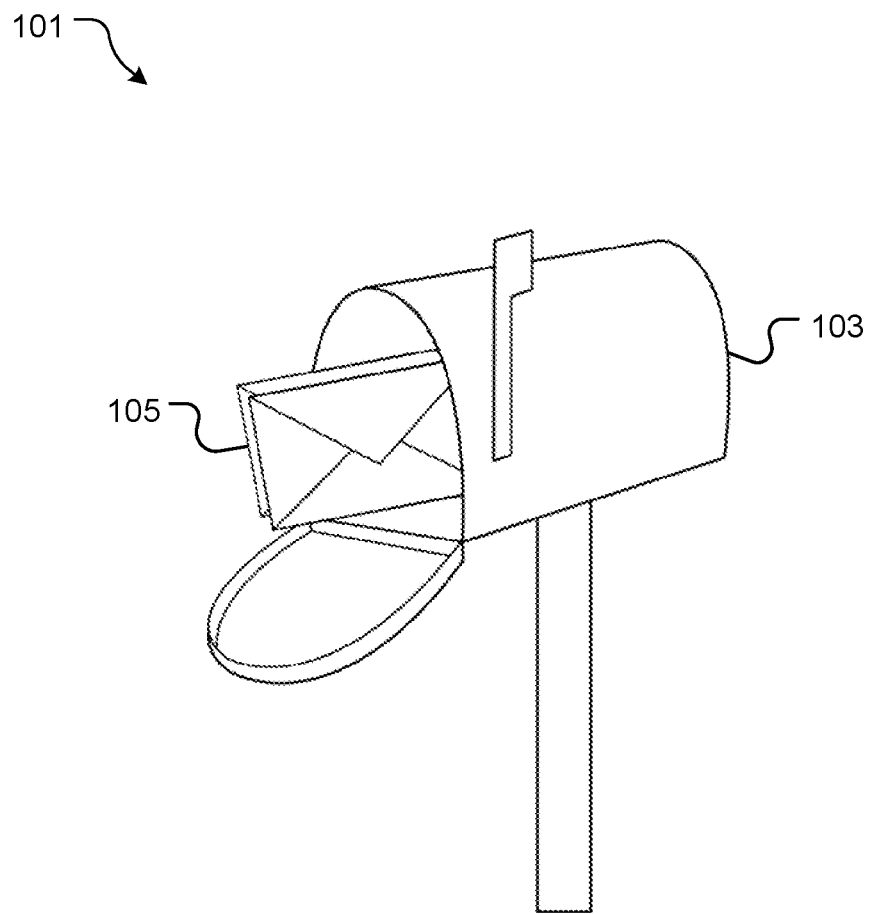
FIG. 1 is a simplified oblique view of a common mail receiving system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional package receiving systems. Specifically, the present invention provides a means to secure packages and mail from outdoor elements and potential theft. In addition, the present invention provides a means for users to receive notifications regarding the delivery of a package via means such as but not limited to notifications via a mobile device and mobile application. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
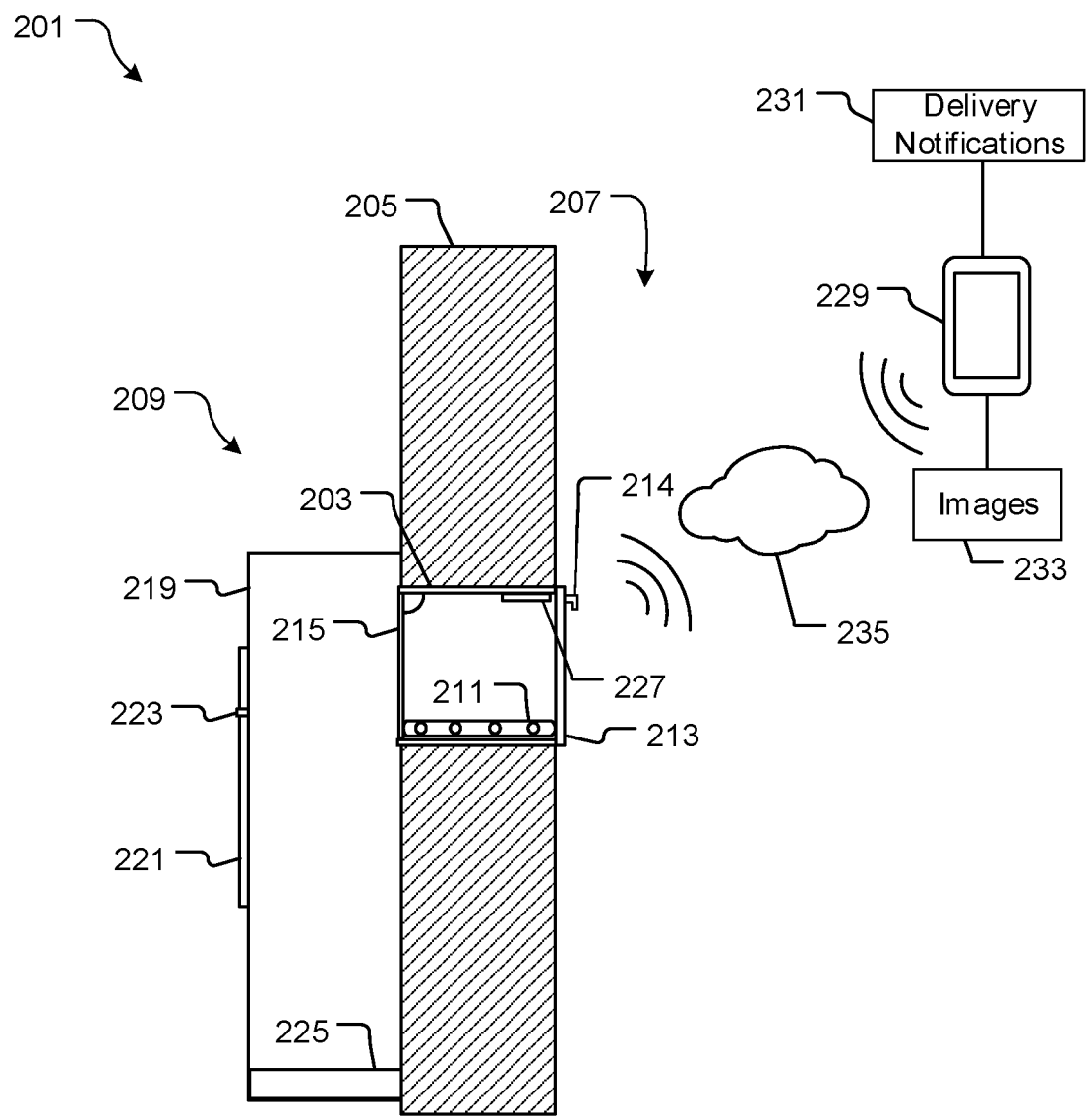
FIG. 2 is a side view of a package receiving system in accordance with a preferred embodiment of the present application.

Referring now to the drawings wherein like reference characters identify corresponding or similar elements throughout the several views, FIG. 2 depicts a side view of a package receiving system in accordance with a preferred embodiment of the present application. It will be appreciated that system 201 overcomes one or more of the above-listed problems commonly associated with conventional package delivery systems.

In the contemplated embodiment, system 201 includes a shoot 203 extending through a wall 205 of a building, thereby leading from an exterior 207 to an interior 209 of the building. It should be appreciated that the shoot can vary in size as necessary based on existing and future constructions of buildings.

Shoot 203 further includes a conveyer belt 211 positioned at the bottom of the shoot and configured to transport a package from a first door 213 to a second door 215. As shown, the first door 213 is positioned on the exterior of wall 205 and can include a handle 214, wherein delivery personnel can either open the door 213 or can insert mail through a slot of the door. It should be appreciated that in some embodiment, a slot is not included.

In the preferred embodiment, second door 215 leads into a cabinet 219 positioned in the interior 209 of the building. However, it is contemplated that the cabinet does not have to be included in all embodiments. Cabinet 219 can include an access door 221 with or without a lock 223, thereby providing the receiving party access to the interior of the cabinet. In addition, a pad 225 can be positioned at the bottom of the cabinet to protect packages as they drop from the conveyer belt 211.

In the preferred embodiment, door 215 is configured to remain closed at any time that door 213 is opened. It should be appreciated that this functionality can be achieved via a mechanical means connecting the doors together, or alternatively, via one or more sensors configured to indicate when door 213 is open. It should further be appreciated that the necessary electrical components, such as power sources are included in system 201 for functionality.

System 201 can further include an electrical control system 227 configured to wirelessly communicate with an electronic device 229, wherein information such as delivery notices 231 and images 233 are transferred to the electronic device via a wireless network 235, thereby providing a means to remotely monitor deliveries. In the preferred embodiment, a scanner is incorporated into control system 227, wherein the scanner is activated upon opening of door 213, thereby providing a means to scan a code associated with the package. One embodiment, includes an RFID scanner, however, other forms of scanners could be used.

Figures 3A, 3B:
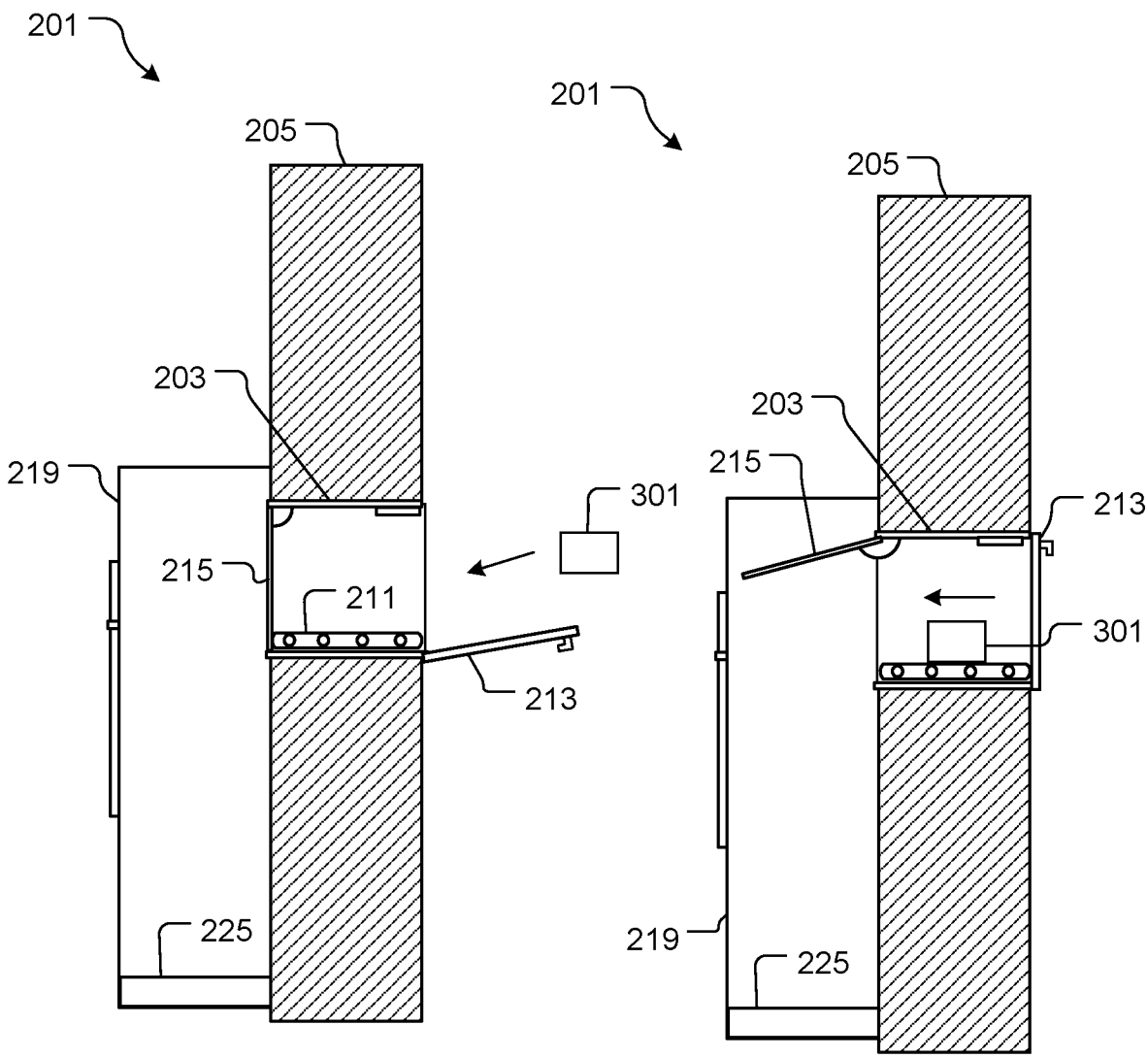
FIGS. 3A-3C depict the system of FIG. 2 in use.
Figure 3C:
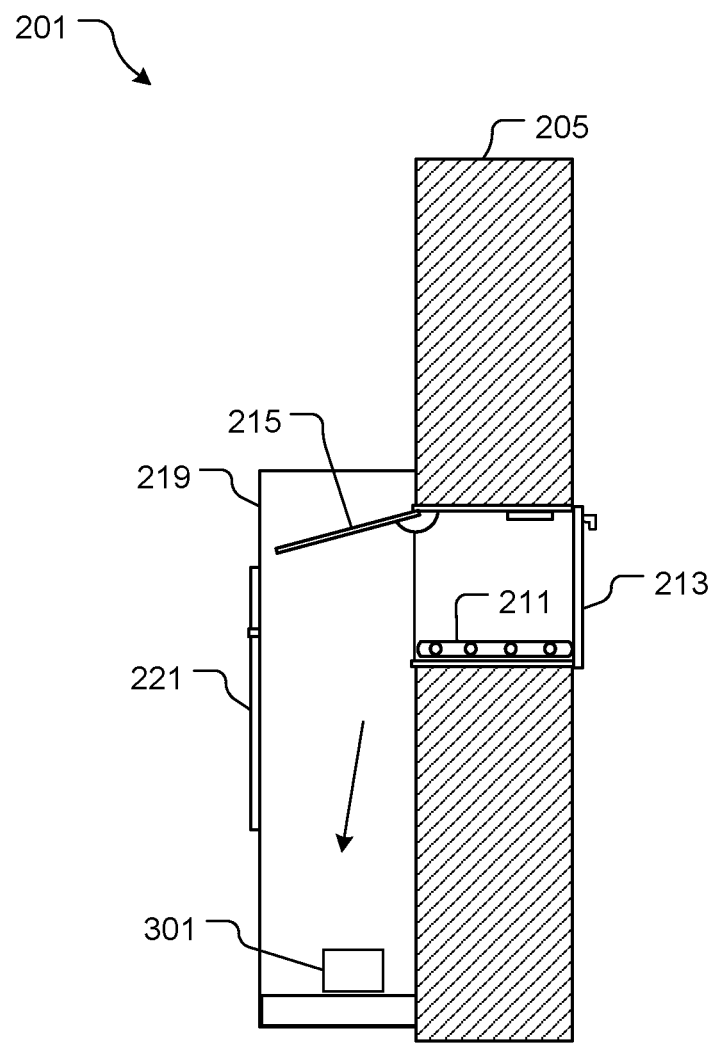

In FIGS. 3A-3C, the delivery of a package 301 is depicted. As door 213 opens, door 215 remains closed for security. Package 301 is placed inside shoot 203 and scanned, wherein conveyer belt 211 transfers package through open door 215 and into cabinet 219. The padding 225 protects package 301 as it hits the bottom of the cabinet. The package can then be removed by the user via door 221.

It should be appreciated that one of the unique features believed characteristic of the present application is the shoot having a first and second door and extending through a thickness of a wall of a building. It should be appreciated that this feature aids in preventing theft and damage to packages, as well as overall security to the building.

Figure 4:
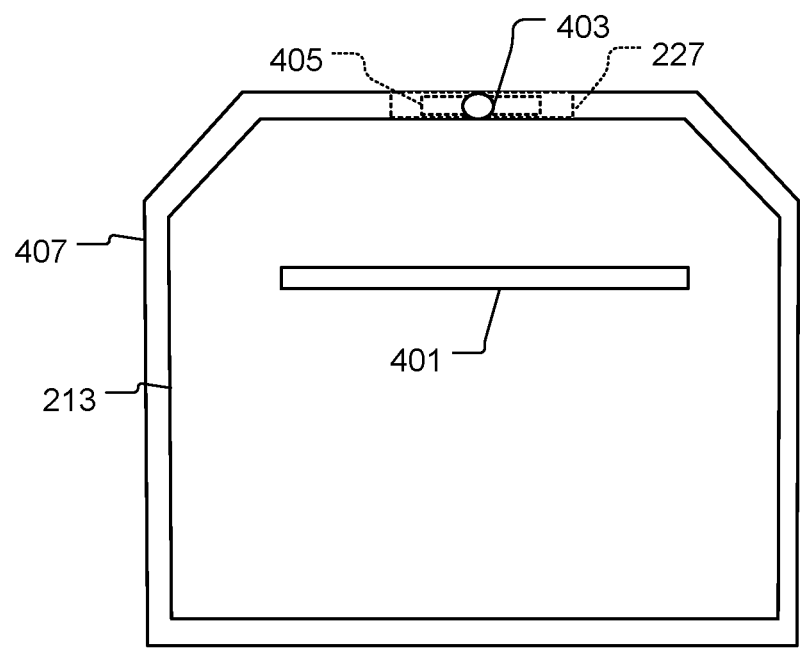
FIG. 4 is a front view of a first door associated with the system of FIG. 2.

In FIG. 4, a front view of door 213 is shown. It should be appreciated that the shape and size of door 213 can vary. In the preferred embodiment, door 213 can include a slot 401 wherein mail and the like can be inserted. In addition, electronic control system 227 can include one or both of a camera 403 and a scanner 405, wherein the camera 403 takes images of deliveries and scanner 405 is configured to scan barcodes and the like associated with packages. In the preferred embodiment, the control system and scanner are embedded above and behind the door, while the camera is mounted to a frame 407 of door 213, however, alternative embodiments contemplate mounting the various features in other locations. Electronic control system 227 further includes a transmitter configured to communicate the images and scanned information to the electronic device for remote monitoring by the user.

Figure 5:
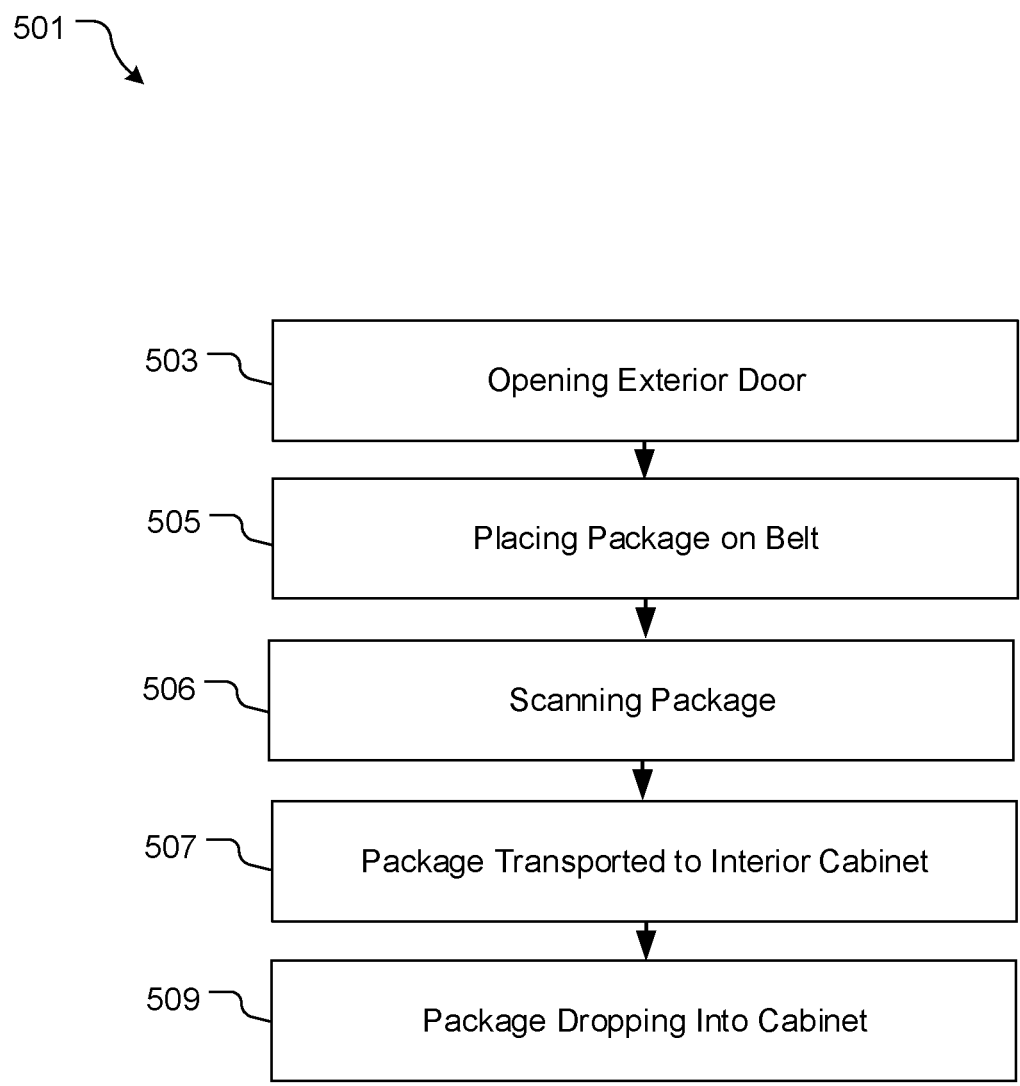
FIG. 5 is a flowchart of the method of use of the system of FIG. 2.

In FIG. 5, a flowchart 501 depicts a method of use of system 201. During use, the exterior door is opened, wherein delivery personnel places a package within the shoot and on the conveyer belt, as shown with boxes 503, 505. It should be understood that in some methods, the delivery personnel merely places mail through a slot in the exterior door. The package or mail is then scanned and transported to the interior cabinet via the conveyer belt and the opening of the interior door, as shown with boxes 506, 507. The package further drops into the cabinet, as shown with box 509.

It should be appreciated that system 201 could further be used for friends, family, and neighbors dropping off packages, gifts, or other items.

Figure 6:
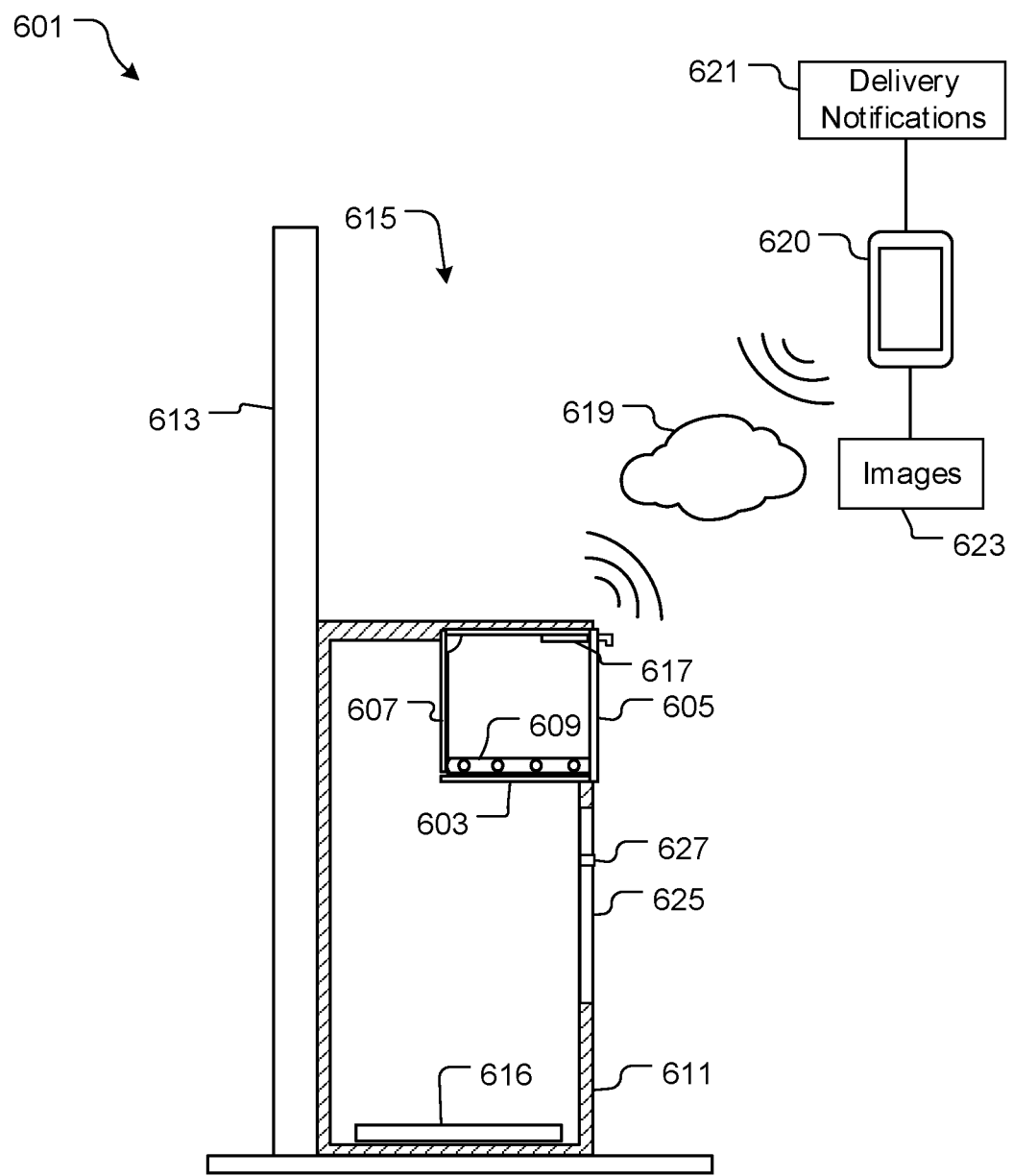
FIG. 6 is a side view of an alternative embodiment of a package receiving system in accordance with the present application.

In FIG. 6, a side view depicts an alternative embodiment of a package receiving system 601 in accordance with the present application. System 601 includes a delivery shoot 603 having the same form and function as the shoot 203, including a first door 605 and a second door 607, wherein a conveyer belt 609 is positioned therein to transport a package. In this embodiment, shoot 603 is positioned through a thickness of a wall of an exterior cabinet 611, the exterior cabinet 611 configured to be secured and anchored to a building wall 613 on the exterior 615 of the wall and can have a pad 616 positioned at the bottom of the cabinet. It should be appreciated that this system provides the same functionality as system 201, but is suitable for existing buildings wherein the user does not want to drastically alter the structure of their building.

System 601 further includes an electronic control system 617 configured to communicate wirelessly through a network 619 with an electronic device 620, thereby providing a means for a user to receive delivery notifications 621 and/or images 623.

During use of system 601, the delivery personnel places a package or mail within shoot 603, wherein the package is scanned and then drops into the cabinet. The package/mail can then be retrieved via an access door 625 having a lock 627 to prevent damage and theft.

Figure 7:
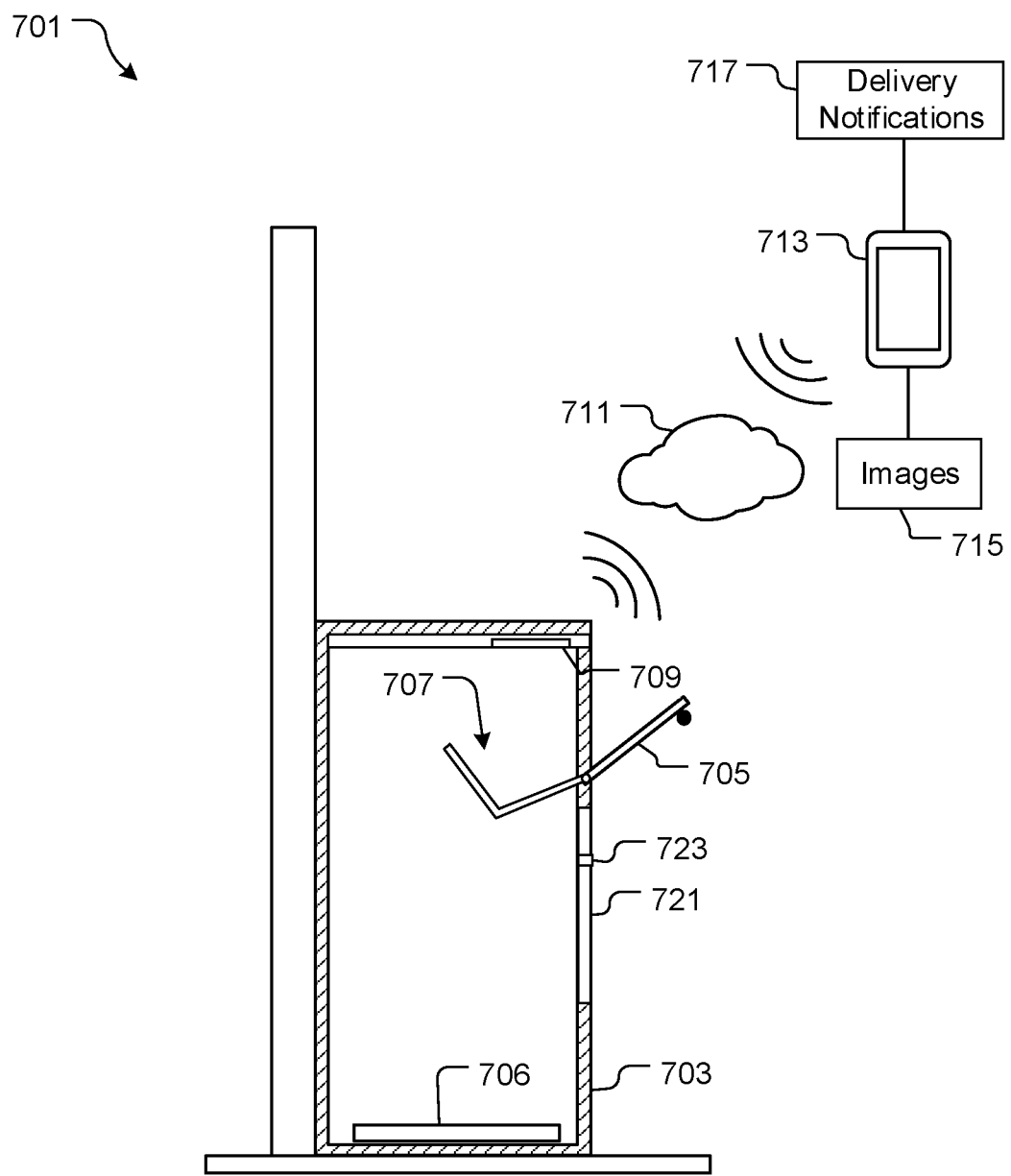
FIG. 7 is a side view of an alternative embodiment of a package receiving system in accordance with the present application.

In FIG. 7, another alternative embodiment is shown, wherein a package receiving system 701 includes an exterior cabinet 703 having a first door 705 configured to provide access to the interior of the cabinet having optional padding 706. First door 705 can provide access to a shoot 707 configured to receive a package therein to then drop the package into the cabinet, when the door 705 is in a closed position. When door 705 is open, the shoot 707 comes forward to block access to cabinet 703. System 701 further includes the features discussed in connection with system 601, including a control system 709 having one or both of a camera and a scanner included therein, wherein the scanner is configured to read a code associated with a package when the package passes underneath or near the scanner. Control system 709 being configured to wirelessly communicate through a network 711 to an electronic device 713 and thereby providing a means for a person to receive images 715 and delivery notifications 717. Cabinet 703 can further include a second door 721 with a lock 723 for providing access to delivered packages.

Figure 8:
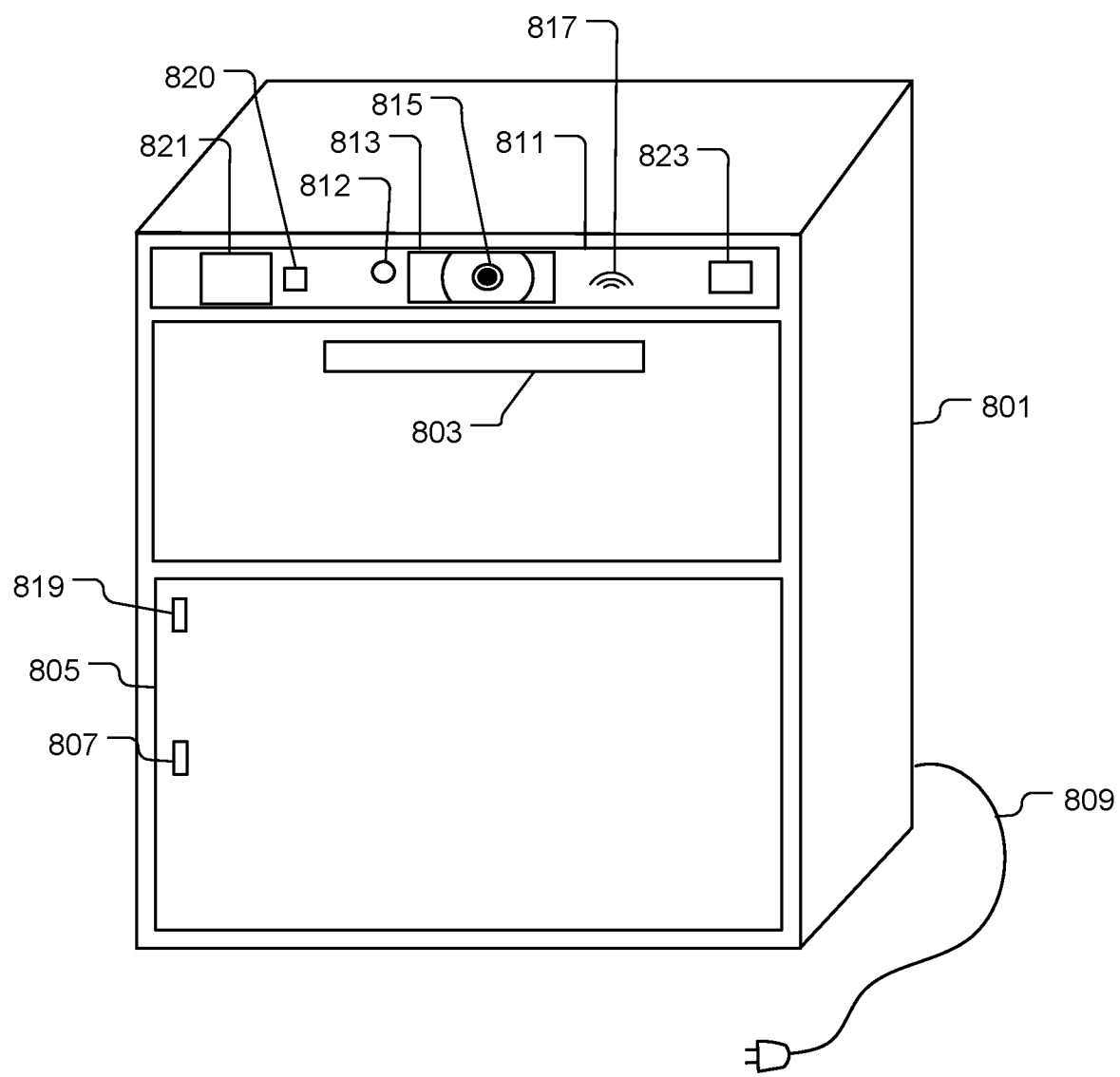
FIG. 8 is a front view of another alternative embodiment of the package receiving system of the present application.

In FIG. 8, a front view further depicts another embodiment of an exterior cabinet 801 in accordance with the present application. It should be appreciated that cabinet 801 may include any or all of the features discussed above, and can be used on a porch or exterior of a building, such as is discussed in connection with FIG. 7. Cabinet 801 includes an opening 803 which may vary in size and may be configured into a door, the opening 803 configured to receive a package for deposit within the cabinet. It should be appreciated that in some embodiments, the opening 803 will be anti-theft, thereby stopping hands from entering the cabinet. It should further be appreciated that the cabinet will be composed of secure, weatherproof material, such as carbon fiber, plastic, or metal.

Cabinet 801 further includes a second door 805, which will include a lock 807, wherein the lock may be configured for use with a physical key, a code, a mobile device, or any other technology. It should be appreciated that the size and style of the door may vary based on aesthetical or functional considerations.

Cabinet 801 further includes a power source 809, which may be a plug and configured to provide power to a control system 811 associated therewith. The control system 811 will include various features, including one or more cameras 815. It should be appreciated that the cameras can vary, such as including night vision. In some embodiments, one or more motion sensors 813 will further be provided to activate the camera based on motion detected. The camera can be configured to capture barcode or other code information, associated with a package, wherein the information can then be transmitted to a mobile device, such as the user's smart phone, as previously discussed. Further, the motion sensor can activate live streaming of video to a user's smart device. The control system therefore including wireless technology 817.

In some embodiments, the system may further include a mic/speaker 812, which can provide for two-way communication with the system. Mic/speaker 812 may be able to receive voice commands and further provide for audible communication to a user or other secondary devices.

The cabinet 801 will further include an alarm 819, which will be configured to provide an alert based on tampering with the cabinet or based on the door being left ajar. In addition, some embodiments will include an electronic pushbutton keypad 821 that allows for locking and entry via manual entry by a user. The keypad may have any combination of numbers, letters, or symbols. In addition, this embodiment may include a biometric scanner 820 to allow for use of morphological biometric identifiers such as the use of fingerprints, the eye (iris and retina), and an individual's face shape (Facial recognition) for security purposes.

In some embodiments, blockchain technology 823 is further provided, wherein encrypted package notification featuring blockchain technology may be utilized for enhanced security. This may include peer to peer networking, distributed timestamping, cryptography hash functions and pointers, and digital signatures.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A package receiving system, comprising:
    a cabinet anchored on an exterior of a building;
    a shoot extending through a wall of the cabinet from an exterior of the cabinet to an interior of the cabinet, the shoot having:
        a first door positioned on the exterior of the cabinet and providing access to the shoot; and
        a second door positioned on the interior of the cabinet and providing access to the interior of the cabinet;
        the second door closes access to the interior of the cabinet when the first door is in an open position;
    a control system incorporated into the cabinet the control system wirelessly communicates with a mobile electronic device, the control system having:
        a scanner positioned with the control system and embedded above and behind the first door, the scanner is configured to automatically read a code associated with a package as the package passes the first door and enters the shoot via the first door, the control system receiving delivery confirmation via the scanner and transmitting automatically to the mobile electronic device;
        wherein the first door allows for the package to be received into the shoot;
        wherein the first door lacks a locking mechanism;
        wherein the second door allows for the package to be received into the interior of the cabinet; and
        wherein the control system is configured to capture data associated with the package entering the cabinet through the scanner.

2. The system of claim 1, wherein the cabinet further comprises:
    an access door being separate and independent of the first door, the access door having a lock and providing access to the interior of the cabinet.

3. The system of claim 1, wherein the cabinet further comprises:
    a padded bottom surface.

4. The system of claim 1, wherein the data is encrypted with blockchain technology.

5. The system of claim 1, wherein the control system further comprises:
    a keypad configured to receive commands from a user.

6. The system of claim 1, further comprising:
    a motion sensor in communication with a camera and configured to activate the camera based on motion detected, the camera collecting image data for automatic transfer to the mobile electronic device via the control system,
    wherein the camera is independent of the sensor and positioned to capture images exterior of the cabinet.

7. The system of claim 1, wherein the control system further comprises:
    an alarm configured to be activated based on tampering with the cabinet.

8. The system of claim 1, further comprising:
    a biometric scanner configured to receive identifying information from the user.

9. The system of claim 1, further comprising:
    a speaker configured to provide audible communication with the control system.

10. The system of claim 1, further comprising:
    a conveyor extending within the shoot between the first door and the second door, the conveyor transports the package from the first door to the second door to enter the interior of the cabinet.

* * * * *